United States Patent

Purcell et al.

[15] 3,674,896
[45] July 4, 1972

[54] BONDING WITH AMMONIUM POLYMER SALTS

[72] Inventors: Chester L. Purcell; Walter H. Smarook, both of Somerville, N.J.

[73] Assignee: Union Carbide Corporation, New York, N.Y.

[22] Filed: June 3, 1970

[21] Appl. No.: 43,196

Related U.S. Application Data

[63] Continuation-in-part of Ser. No. 669,259, Sept. 20, 1967, abandoned, Continuation-in-part of Ser. No. 568,409, July 28, 1966, abandoned.

[52] U.S. Cl. ...................260/897 B, 117/6, 117/72, 117/124 E, 117/132 C, 117/140 A, 117/138.8 A, 117/138.8 UA, 117/142, 117/148, 117/155 UA, 117/161 UC, 117/161 UT, 117/161 H, 117/161 UZ, 156/327, 156/334, 161/159, 161/190, 161/216, 161/203, 161/250, 161/252, 260/23 H, 260/23 AR, 260/28.5 R, 260/29.6 WA, 260/29.6 RW, 260/29.6 H, 260/41 A, 260/88.1 PC
[51] Int. Cl. .......................................C08f 29/12
[58] Field of Search...............117/161 UC, 161 UT, 161 UH, 117/6, 140 A, 148, 155 UA; 260/897 B

[56] References Cited

UNITED STATES PATENTS

3,347,811  10/1967  Bissot ..................................260/29.6
3,214,488  10/1965  O'Donnell et al.......................260/854

OTHER PUBLICATIONS

Shawinigan–Gelvatol, 64, pp. 1–4 and 20–21

*Primary Examiner*—Samuel H. Blech
*Assistant Examiner*—C. J. Seccuro
*Attorney*—Paul A. Rose, Aldo J. Cozzi and Bernard F. Crowe

[57] ABSTRACT

Water-soluble ammonium salts of ethylene-acrylic acid copolymers are used to coat or bond various substrates with water insoluble ethylene-acrylic acid copolymers by first applying the salt alone or with polyvinyl alcohol to the substrate from aqueous solutions or dispersions and then drying the treated substrate. During the drying step ammonia is evolved leaving the ethylene-acrylic acid copolymer on the substrate. This invention has been used to coat articles with a temporary coating, and to prepare floor polishes, paper coatings, nonwoven fabrics and water-proof wood.

10 Claims, No Drawings

BONDING WITH AMMONIUM POLYMER SALTS

This is a continuation-in-part of Ser. No. 669,259 filed Sept. 20, 1967 now abandoned which is in turn a continuation-in-part of Ser. No. 568,409 filed July 28, 1966 now abandoned.

This invention relates to methods of bonding various adherends with ammonium polymer salts and more particularly, to the use of ammonium salts of ethylene-acrylic acid copolymers.

It is known that polymers containing polar groups adhere or bond to many substrates. Such polar group containing polymers have been applied to various adherends by such methods as extrusion coating, pressing, solution coating and the like. However, these methods have some undesirable features. For example, extrusion coating equipment is expensive both to operate and maintain and requires such operating space due to the bulk of the equipment used. Solution coating from organic solvents obviates some of the drawbacks of extrusion coating but presents its own problems in the form of toxicity, fire hazards, cost solvent recovery and the like.

It has now been discovered that aqueous solutions or dispersions can be used to apply normally solid ethylene-acrylic acid copolymers to a myriad of substrates or adherends. The use of cheap non-toxic aqueous solutions or dispersions has been made possible by utilizing ammonium salts of these ethylene-acrylic acid copolymers. Being soluble or dispersible in water, the ammonium salts can be easily transferred to the desired adherend leaving a deposit which upon drying reverts to the ethylene-acrylic acid copolymers with evolution of ammonia gas. This reversion can be accelerated by heating.

The ethylene-acrylic acid copolymer ammonium salts used in this invention have about 10 to 100 percent of the acrylic acid moieties neutralized with ammonium cations. The neutralization can be effected with either gaseous ammonia, $NH_3$ or aqueous ammonium hydroxide. Although completely neutralized copolymers are the most soluble or dispersible in water it is not necessary to employ them. The minimum degree of neutralization required will vary with the end-use sought, the amount of acrylic acid in the copolymer and the molecular weight the copolymer.

The uses to which this process can be put are legion. Thus for example, in the case of a large flat surface treated with an ammonium polymer salt solution or dispersion, after reversion to the free carboxyl-containing polymer we have an article comprising the adherend plus a continuous coating of a polymer which can serve either as a coating per se or as an adhesive surface for further bonding the coated article to yet another substrate. Intricate shapes are coated as easily as planar surfaces.

The process of this invention provides a means of coating the adherends hereinafter enumerated as well as bonding two or more of said adherends in gross or particulate forms of even colloidal dimensions. Thus the ambit of the invention extends from the bonding of a relatively small number of adherends in a continuous or integral form down to an infinite number of particles having dimensions as small as colloidal particles.

In addition the purview of this invention extends to the bonding of gross structured adherends to small particle adherends. Thus for example a powdered adherend can be bonded to a planar surface. The ethylene-acrylic acid copolymer can function to bind the powdered particles to each other and to the planar surface.

Substrates or adherends such as nonwoven fabrics which are composed of various tangles of filaments or threads which are not readily available for bonding in a simple extrusion or pressing operation, are easily bonded into an integral fabric by the above described process. In soaking the nonwoven fabric in an aqueous solution of the ammonium salt of the ethylene-acrylic acid copolymer, the salt solution can readily penetrate to not only the surface of each fiber, but by capillary action to within each fiber. Upon heating, at about 20° to 165° C. for at least one minute, free carboxyl-containing ethylene-acrylic acid copolymer is then produced in areas inaccessible to the carboxyl-containing polymer itself directly.

Wood surfaces which are readily permeated by the aqueous ammonium salt polymer solutions, are rendered waterproof by immersion for at least one minute in the solution at ambient temperature followed by drying for at least 20 seconds at 20° to 165° C. Pressure is not critical.

This process is readily adaptable to the paper industry for the preparation of clay coated paper wherein the ammonium salt when applied as an aqueous dispersion or slurry with the clay to the paper to be treated, effects a bond between the clay particles themselves and between the clay particles and the paper substrate. The reaction conditions requisite for this paper coating lend themselves to those which are presently used in the paper industry today, as for example, by heating to a temperature of about 50° to 175° C. for at least one minute.

Another application in the paper industry resides in the use of sizing compositions comprising an aqueous dispersion of ethylene-acrylic copolymer ammonium salt blended with highly hydrolyzed polyvinyl alcohol having degrees of hydrolysis greater than 98 percent, preferably greater than 99 percent and ideally above 99.7 or 99.8 percent hydrolyzed. The resultant compositions when applied to paper and dried render the paper so treated more water resistant than when treated with either the ethylene-acrylic acid copolymer or the polyvinyl alcohol alone. As will be demonstrated later with examples, this effect is unexpectedly synergistic with the maximum in water resistance being achieved at a weight ratio of about 50:50 to 60:40 ethylene-acrylic acid copolymer to polyvinyl alcohol. However other ratios such as 70:30, 80:20, 90:10, 95:5 40:60, 30:70, 20:80, 10:90 and 5:95 of ethylene-acrylic acid copolymer to polyvinyl alcohol can be used too. While the ethylene-acrylic acid copolymer can be fully neutralized with ammonium hydroxide, ammonium salts with lesser degrees of neutralization can also be used as long as the resultant copolymer salts are water dispersible. The degree of neutralization required for obtaining a dispersible copolymer varies with the acrylic-acid content and the molecular weight of the copolymer. When polyvinyl alcohols having a degree of hydrolysis below 98 + percent are used the water resistance of the blends with ethylene-acrylic acid copolymers falls off sharply. The viscosity of the polyvinyl alcohols used herein are those described in the literature of this art as medium to high viscosity which is defined in "Vinyl and Related Polymers" by C.E. Schildknecht, pages 350–1 John Wiley and Son, NYC, 1952 as 23–28 centipoises for the former and 45–55 centipoises for the latter and incorporated herein by reference. No special equipment or techniques are needed for application of these size dispersions to paper substrates. For convenience conventional tub sizing can be used.

The total solids content of the dispersions used to prepare water resistant paper coatings is not narrowly critical but for obvious economic reasons it is preferred to keep it at a minimum. It has been found to be both useful and practical to employ dispersions having a total solids content of the paper coating dispersions of about 0.5 to 2.0 percent by weight. These in general afford a pick-up on the sized paper of about 0.7 to 3.0 percent solids.

The acrylic acid content of the ethylene-acrylic acid copolymers used specifically in these paper coating compositions with polyvinyl alcohol can contain about 10 to 25 percent by weight of acrylic acid copolymerized therein with about 13 to 22 percent and 15–20 being particularly preferred.

The melt index of these ethylene-acrylic acid copolymers can range from about 2 to 400 dg./min. with preferred ranges being about 5–125, 5–80, 50–400 and 100–400.

The time during which the paper to be sized is held in contact with the sizing solution described above is not critical. It is sufficient to merely pass the paper to be treated through the sizing solution as long as the paper is thoroughly wet or saturated by the solution.

The time required for drying the treated paper wet with the solution is also not critical.

The term "acrylic acid" is used in the instant invention is a generic sense and encompasses both acrylic acid, $CH_2 = CHCOOH$, as well as methacrylic acid, $CH_2 = CCH_3COOH$.

The temperature at which the paper to be sized is contacted with the sizing solution is not critical.

The process of this invention may also include the use of conventional floor polishing formulations to afford a floor polish which is resistant to water after gradual evolution of ammonia. The free carboxyl-containing ethylene-acrylic acid copolymers formed after ammonia evolution while water resistant, is removable at the option of the user by the application of an ammonium hydroxide-containing cleaning solution.

This property of being capable of being removed by an aqueous ammonium hydroxide-containing cleaning solution also lends itself to the use of this process in the application of temporary protective coatings to various substrates such as automobile chrome bumpers, hub caps, and other accessories, finely machined parts such as gears, and the like. If desired, this removable character can be enhanced in the deposited polymer by using a mixed salt consisting of ammonium cations and an alkali metal cation. Thus, when the ammonia, being fugitive is removed, the deposited polymer contains not only free carboxyl groups but some alkali metal carboxylate groups which enhance the overall solubility of the polymer in aqueous ammonium hydroxide solution. In fact, if the concentration of residual alkali metal carboxylate groups in the deposited polymer is high enough, the deposited polymer is removable by washing with common soap solutions without using aqueous ammonium hydroxide.

As a further variation temporary protective coatings which are removed by peeling rather than by washing can be formulated from mixtures of ethylene-acrylic acid copolymer salts with up to about 50 percent based on the weight of polymer salt, of polyvinyl alcohol which has been hydrolyzed to the extent of about 71 to 98 percent. For this end-use water sensitivity also is undesirable, the criterion being a formulation which forms a film about two to four mils thick on the treated substrate having a peel strength of about one to two lbs. per lineal inch. Films exhibiting greater peel strengths are not readily removable for all practical purposes while films showing lesser peel strengths are too easily removable by inadvertent stresses to form a useful protective coating.

The process of this invention can also be used in leather finishing, in the formulation of latex paints, nail polish, hair spray, thickening agents, extrusion coating primers, emulsifying agents, surfactants and the like.

The carboxyl content of the starting ethylene-acrylic acid copolymer is preferably in the range of about 10 to 25 mole percent of the total polymer although contents of about one to 50 mole percent can also be employed, if desired. The starting ethylene-acrylic acid copolymer used to make polymer carboxyl salts in this invention should contain sufficient carboxy groups of permit the formation of at least water-dispersible salts and preferably water-soluble salts. Solubility increases as the carboxyl salt moiety content of the polymer is increased. The carboxyl salt moiety content of the polymer which is required to render the polymer water-dispersible can be decreased as the molecular weight of the polymer is decreased.

The carboxyl salt moiety content of these polymer salts is preferably about three to 25 mole per cent of the total polymer salt although other ranges can also be employed, if desired. The term "carboxyl salt moiety" includes both the carboxyl anion and the monovalent cation.

As stated above, although the ethylene-acrylic acid copolymer salt contains mainly ammonium cations, there can also be included alkali metal cations such as, sodium $Na^+$, $K^+$, $Li^+$ and the like.

The concentration of polymer salt in the aqueous solutions or dispersions used in this invention in general is not narrowly critical. A preferred range is about 1–40 percent solids by weight with about 5 to 20 percent being particularly preferred.

No special mixing equipment is required for the preparation of the salts other than what is conventionally used for simple mixing and heating operations well known in the art.

For the preparation of the polymer salt, atmospheric pressure is preferred although both substmospheric and super-atmospheric pressure can also be used if desired. Where atmospheric pressures are used, a temperature not exceeding about 98° C. is preferred because of the reversible character of the ammonium carboxylate radical formed. Where superatmospheric pressures are used this temperature of course can be exceeded.

For the reverse process, that is the regeneration of ethylene-acrylic acid copolymer, from the ammonium salt, a temperature in the range of about 20° to 150° C. is preferred, although temperatures above and below this range can be used is desired. The time required for the reversion of ammonium salt is also not narrowly critical but is of course temperature dependent. Thus at elevated temperatures (e.g., above 150° C.) the time required can be as little as one minute or even less. At room temperature, longer times are required, up to 90 minutes or more, to achieve satisfactory adhesion between porous substrates for example. It is not absolutely necessary to evolve all of the available ammonia to achieve a satisfactory level or adhesion with these systems. There is no practical upper limits since once the reversion has taken place further heating has no deleterious effect, providing temperatures are not high enough to cause thermal or oxidative degradation of the polymer.

The term "dispersion" is used herein to mean minute polymer salt particles suspended in water and includes colloids, latexes, hydrosols and the like.

Although the number of substrates or adherends to which this invention is applicable are numerous the following adherends are particularly preferred namely polar synthetic polymers, cellulose, cellulose acetate, regenerated cellulose, proteinaceous materials, natural resins, asphalt, asbestos, metals, vitreous materials, natural fibers, building materials, siliceous materials, and the like. Combinations of the above are also readily amenable to this invention as for example in the case of floor tile where vinyl polymer is combined with asphalt or with asbestos or where asphalt and asbestos are themselves combined to constitute the floor tile.

In general, the adherends useful in this invention have a higher surface energy than the free carboxyl-containing ethylene-acrylic acid copolymer used to bond them. These adherends can be particulate, granular, fibrous, filamentary, ropey, woven, nonwoven, porous, non-porous, rigid, or non-rigid.

Examples of metal adherends include aluminum, chromium, cobalt, copper, gold, iron, lead, magnesium, nickel, platinum, silver, tin, titanium, tungsten, vanadium, zinc, and the like as well as alloys such as alloy steel, alnico, brass, bronze, carbon steel, cast iron, chromium steel, nichrome, pewter, solder, stainless steel, sterling silver, and the like. These metal adherends can be in the form of powders, granules, whiskers, leaves, foils, sheets, bars, rods, wires and the like.

Vitreous adherends include glass, glassware, ceramics, clays, enamel materials, china, porcelain, and the like.

Cellulosic adherends include wood, plywood, sawdust, cane, bamboo, rattan, paper, kraft paper, and the like.

Natural resins include asphalt, bitumen, gums, lacquer, pitch, rosin, rubber, shellac, tar, varnish, and the like.

Polar synthetic polymeric adherends include thermosetting polymers such as phenolaldehyde condensation polymers, coumarone indene polymers, phenol urea polymers, epoxy resins and the like, and thermoplastic polymers such as styrene polymers, acrylonitrile polymers, polycarbonates, polyurethanes, polyacetals, polyamides, synthetic rubbers, and the like.

Proteinaceous materials include leather, hides, furs, pelts, gelatin and the like.

Natural fibers include cotton, linen, silk, wool, flax, hemp, jute, manila, sisal and the like.

Building materials include brick, granite, sandstone, plaster, tile, wallboard, cement blocks, and the like.

In the practice of this invention individual substrates can be bonded separately or a continuous process can also be used. Thus, for example, in the latter case if one were to bond, for example, paper to aluminum in a continuous strip, a roll of aluminum can be used to feed a continuous strip through a bath of aqueous ammonium polymer salt from which the strip can be lead to a drying oven where the ethylene-acrylic acid copolymer is then formed as a coating on the continuous aluminum strip and the coated aluminum strip can then be lead from there to a laminating roll where it joins a continuous strip of paper. The convergent strips would then emerge from the laminating rolls as a paper-aluminum-laminate.

The invention is further illustrated by the examples which follow in which all parts and percentages are by weight unless otherwise specified.

EXAMPLE 1

20 grams of powdered ethylene-acrylic acid copolymer containing 22 percent acrylic acid copolymerized therein and having a melt index of 350 dg./min. was slurried with 200 ml. of 3 percent aqueous ammonia. A clear solution was obtained after heating the slurry at 85°–100° C. for 20–30 minutes. A film was cast from the resultant solution and dried at 120° C. for five minutes. This film consisted of ethylene-acrylic copolymer as evidenced by infrared analysis which showed a typical acrylic acid absorption at 5.85μ and the absence of salt absorption at 6.5μ. This observation demonstrates that the ammonium salt was regenerated upon heating to the original water insoluble ethylene-acrylic acid copolymer and $NH_3$.

EXAMPLE 2

Example 1 was repeated using 50 g. of 80 mesh powdered ethylene-acrylic acid containing 22 percent acrylic acid copolymerized therein and having a melt index of 350 dg./min. A slightly cloudy solution was obtained after heating at 95°–110° C. for 20–30 minutes with a slurry of 450 g. of 5 percent aqueous ammonia from which a clear film was obtained by solution casting and drying at 120° C. for five minutes. Infrared examination indicated the film was the original ethylene-acrylic acid copolymer which was water insoluble.

EXAMPLE 3

Example 1 was repeated using 600 g. of an ethylene-acrylic acid copolymer containing 21 percent acrylic acid copolymerized therein and having a melt index of 330 dg./min. and a solution of 170 g. of 28 percent ammonium hydroxide in 2400 g. of water. A slightly cloudy polymer ammonium salt solution was obtained from which a clear film was cast which after drying at 120° C. for five minutes was shown by infrared examination to be the original ethylene-acrylic acid copolymer which was water insoluble.

EXAMPLES 4–6

A floor polish preparation was formulated by blending 10.6 parts of high density polyethylene wax containing terminal succinic acid groups, 1.8 parts of oleic acid, 1.06 parts of morpholine, 3.0 parts of the ethylene-acrylic acid ammonium salt solution prepared in Example 3 and 83.54 parts of water.

This preparation when applied on glass plate, asphalt floor tiles or vinyl-asbestos floor tiles and allowed to dry at ambient temperatures afforded a coating showing excellent gloss and hardness. Once dry these coatings did not water spot. The above-described preparation was also found to be compatible with commercially available polyacrylate floor polish formulations.

EXAMPLE 7–9

The floor polish preparation described in Examples 4–6 was evaluated for removability using the Gardner washability test, described in ASTM D–1792–60T on asphalt tiles coated with the said preparation. This test showed that the polish preparation could not be removed from the asphalt floor tiles with the standard soap solutions specified in ASTM D–1792–60T. However, the polish preparation was readily removable under the same conditions using a 2.0 percent aqueous ammonia solution in place of the standard soap solution.

EXAMPLE 10

Pieces of cellulose acetate nonwoven fabric web, 6 inches × 6 inches, were immersed in a 10 percent aqueous solution of the ethylene-acrylic acid ammonium salt solution prepared in Example 3. Weight pick-up on the fabric web after drying at 120° C. was regulated to give a range from 1 to 10 percent. All samples were well bonded to ethylene-acrylic acid copolymer after this treatment with stiffness of the treated fabric increasing with polymer content. The webs so treated were not wetted when immersed in water.

EXAMPLE 11

50 grams of alpha cellulose was added to one liter of water and beaten for 10 minutes in a Waring Blender. After soaking in water overnight the resultant pulp was squeezed free of excess water by hand and shaped into a ball. The pulp was divided into five portions, each of which was added to a separate one quart Waring Blender containing a 20 percent aqueous solution of an ammonium salt of a ethylene-acrylic acid copolymer containing 18–21 percent acylic acid copolymerized therein and having a melt index of 200–300 decigrams per minute which solution contained a 50 percent excess of ammonium hydroxide over the stoichiometric amount required for complete neutralization of the ethylene-acrylic acid copolymer. After stirring for 10 minutes in the Waring Blender, the five portions were recombined and placed in a shaker screen having wooden sides 5⅝inches × 6 inches × 1¼ inches and 35 mesh screen. The shaker screen assembly had been previously mounted in a galvanized tin baking pan having internal dimensions of 12¾ inches × 9 inches × 2 inches. As the pulp-water slurry was poured onto a shaker frame, the cellulose mixture floated to the surface of the liquid above the screen. By shaking the screen lightly these floating cellulose fibers arrange themselves in a uniform dispersion. Upon lifting the screen out of the pan the excess water ran through the screen into the pan leaving a mat of coated cellulose fibers remaining on the screen. The screen was then dried by blotting the undersurface of the screen on a felt base. The screen was then inverted and the cellulose mat which fell out was placed in a drying oven at 85° C. for 30 minutes. The dried mat comprises alpha cellulose particles bound together by an ethylene-acrylic acid copolymer which resulted from the elimination of ammonia in the drying oven from the original ammonium polymer salt.

A portion of this mat was pressed in a Carver press between two sheets of two ml. polyethylene terephthalate film at a temperature of about 185° C. for 1.5 minutes under a pressure of 10 psi. The press was cooled for six minuted and the mat removed. Upon stripping the film from the mat, a flossy surface sheet 0.018 inch in thickness was obtained. Samples of cellulose sheet prepared in this fashion, after immersion in distilled water for three months, showed no loss of rigidity or waterproof characteristics thus indicating excellent wet strength.

EXAMPLE 12

A waterproof chemical resistant filter was fabricated from a nonwoven fabric in the form of a "Masslinn" towel (trademark of Chicopee Mills Inc.) by taking a sample of the above described towel measuring 12 inches × 17 inches weighing 6.472 grams and soaking in the same ammonium salt solution described in Example 11. After a few minutes soaking, the wet towel was dried in an oven for 30 minutes at 85° C. The weight of the dried towel was 10.128 grams.

From the area of the original towel which was 204 square inches, it is calculated that the increase of solid content was 0.18 grams of polymer deposited per square inch of fabric.

The treated towel was planished by pressing in a Carver press using the conditions described in Example 11. The so-treated towel was then cut and used in a funnel for the filtration of aqueous solution and showed no deleterious effect due to the passage of water through it.

EXAMPLE 13

A piece of Douglas fir plywood 6 inches × 6 inches × ⅜ inch was soaked in a 10 percent aqueous solution of the ethylene-acrylic acid polymer ammonium salt described in Example 11. After soaking for 10 minutes at room temperature the treated plywood was dried in an oven at 85° C. for 30 minutes. A duplicate sample of plywood used as a Control (1) was also dried in the oven at 85° C. for 30 minutes but without pretreatment. The treated piece of plywood and the Control (1) were each bonded to a sheet of ethylene-acrylic acid copolymer having an acrylic acid content of 19–22 percent and a melt index of 50–90 dg./min. by pressing in a Carver press at 80° C. and 83 psi. between two sheets of polyethyleneterphthalate film for two minutes. The press was cooled for six minutes and the pressed plywood removed from the press and tested for peel strength in an Instron tensile test machine at a two inch/min. cross head speed. Strips one inch wide were used for this determination measured in two directions, that is, in a direction with the grain, and perpendicular to the grain. Peel value with the grain for the control was two pounds per inch, while the peel value for the treated sample with the grain was 18 pounds per inch. The peel value for the Control (1) right angles to the grain was 1.5 pounds per inch whereas the peel value for the treated plywood was 8 pounds per inch.

EXAMPLE 14

Plaques of Douglas fir plywood 6 inches × 6 inches × ⅜ inch were immersed in a solution of the ammonium salt of ethylene-acrylic acid polymer described in Example 3 for 10 minutes at room temperature and then dried for a half hour at 85° C. in an oven. The dried plaques were then placed in a Carver press covered with sheets of low density polyethylene having a melt index of about two dg./min. The press conditions were such that an initial temperatures of about 188° C. was used in conjunction with a pressure of about one psi for one minute. The press was then slowly cooled while the pressure was gradually raised up to a value of about 80 psi. When the press temperature reached room temperature the plaques were left in the plates for about six minutes and then removed. The peel strength across the grain was measured as six pounds per linear inch and with the grain also six pounds per linear inch. Plaques pressed to polyethylene without treatment as above with the ammonium polymer salt would give values of about one pound per linear inch or less.

EXAMPLE 15

An aluminum panel 4 inches × 8 inches × 0.025 inch thick was immersed in an ammonium polymer salt solution at about 10 percent solids concentration prepared as described in Example 3. The panel was removed from the salt solution and dried in an oven for 30 minutes at 85° C. The coated panel was then placed in a press without closing the platens while raising the temperature of the press to about 220° C. This had the effect of heating the coated panel which was then removed from the press and placed in contact with a slab of polyurethane foam (synthesized from tolylene diisocyanate and propylene ether glycol) applying a pressure of about one psi to the polyurethane panel laminate. The adhesion of this laminate was evinced by the fact that when one attempted to peel the polyurethane from the panel the polyurethane itself tore in a cohesive break.

EXAMPLE 16

Cotton fabric was laminated to a coated aluminum panel prepared as in the previous example. Here too the adhesion between the cotton layer and the metal panel was excellent.

EXAMPLE 17

A piece of glass reinforced sytrene-acrylonitrile copolymer approximately 4 inches × 8 inches × ¼ inch was laminated as per the procedure in the two previous examples to polyurethane (synthesized from tolylene diisocyanate and propylene ether glycol). The laminae could not be separated without tearing the polyurethane slab apart in a cohesive break.

EXAMPLES 18–20

Examples 15, 16, and 17 were repeated with the exception that a steel panel was substituted for the aluminum panel of Examples 15 and 16 and the styrene-acrylonitrile copolymer of Example 17. Similarly good adhesion was obtained between the metal panel and the other laminae.

EXAMPLE 21

The procedures described in Example 14 were repeated with the exception that high density polyethylene was used in place of low density polyethylene and an aluminum panel was used instead of plywood. The following exceptions were followed however: the coating of the ammonium salt on the aluminum panel was dried at 90° C. for 10 minutes and then laminated to the high density polyethylene at a temperature of 195° C. for one to 1½ minutes at a pressure of about 68 psi. The peel strength of the resultant laminate was about five pounds per lineal inch.

EXAMPLE 22

A plaque of foamed high density polyethylene 7 inches × 7 inches × ⅜ inch (density 0.7) was coated with an ammonium salt solution such as that described in Example 1. The coated plaque was dried at about 50° C. for about 30 minutes. A strip of paper was then placed over the coated polyethylene plaque which in turn was placed in a heated press. The jaws were closed quickly and released for a contact time of about ½ second. This operation simulates impulse hot stamping operation. A strong laminate between the high density polyethylene and paper resulted.

EXAMPLES 23–26

An ethylene-acrylic acid copolymer containing 21 percent acrylic acid polymerized therein and having a melt index of 330 dg./min. was neutralized with a mixture of hot aqueous ammonium hydroxide and sodium hydroxide in varying amounts so as to produce ethylene-acrylic acid copolymer salt which after heating to remove ammonia contain varying sodium acrylate moieties in the polymer namely 20 weight per cent, 12 weight per cent, 10.5 weight per cent and six per cent. A control (2) was also prepared with ammonium hydroxide alone so that after heating and removal of ammonia the resultant ethylene-acrylic acid copolymer contained no sodium acrylate therein. The four sodium acrylate containing copolymers and the control composition were used to coat steel panels which had previously been coated with a thermosetting acrylic resin finish. This was accomplished by applying a five mil thick wet coating on the panels, using a drawdown bar, followed by a drying of the so-treated panels at 120° C. for five minutes. A Gardner washability tester was then used to determine the ease of removing the ethylene acrylic acid copolymer top coatings with water and with soap solution. This test with the coated panels simulates the coating removal removal results which would be obtained with metal equipment such as that found on an automobile during shipment, storage, and preparation for sale. The washing results are delineated in Table 1 showing the number of wash cycle strokes to remove said coatings with in one case water and the other case soap solution. These data show that at the higher sodium acrylate levels the top coating is much more susceptible to removal than at the lower level. Thus, for example, at a six per cent sodium acrylate level the wash cycle approximates that of the control. As 10.5 per cent sodium acrylate level there is a decided drop which continues sharply at the 12 and 20 per cent sodium acrylate levels.

TABLE 1

|  | Examples | | | control 2 |
|---|---|---|---|---|
|  | 23 | 24 | 25 | 26 |
| Wt. % sodium acrylate in coating | 20 | 12 | 10.5 | 6.0 | 0 |
| Wash cycles to remove:(Water) As coated | 2 | 50 | 192 | >250 | >250 |
| Wash cycles to cycles to remove:(soap solution) As coated | 2 | 4 | 18 | 200 | >250 |

EXAMPLE 27

A plaque of Douglas fir plywood 4 inches × 6 inches × ⅜ inch was inpregnated with an aqueous solution of an ammonium salt of an ethylene-acrylic acid copolymer containing about 20 percent acrylic acid copolymerized therein and having a melt index of about 200. The solids content of said solution being about 10 percent and the percentage of carboxyl groups converted to ammonium acrylate moieties being about 60 percent. The plaque was dried at about 85° C. for 30 minutes and then immersed in a sensitizing solution having the following formula:

| Stannous chloride ($SnCl_2 \cdot 2H_2O$) | 100 grams |
| Conc. Hydrochloric acid (37% HCl) | 400 cc. |
| Water | 1000 cc. |

The time of immersion was about one minute followed by a one minute rinse in running water. This operation resulted in a sensitized surface. The treated plaque was then activated by immersion in a dilute solution of palladium chloride and then transferred to an electroless plating bath containing copper sulfate, water, hydrazine sulfate, sodium hydroxide, and water. There was thus obtained a wood plaque coated with a continuous layer of metallic copper which could now be further electroplated by ordinary methods because of its imparted conductance.

Polymeric films having characteristic paper-like qualities can also be bonded to other substrates by means of the polymeric ammonium salts described in this invention. The polymeric films referred to comprise:

1. a high density polyethylene resin having a melt index of from 0.1 to 2.0 dg./min.;
2. from five to 50 parts by weight of an ethylene-vinyl copolymer accommodation resin having a melt index of from 0.2 to 11 dg./min. per 100 parts of high density polyethylene resin; and
3. from five to 75 parts of a finely divided siliceous filler per 100 parts of high density polyethylene resin or from five to 50 parts of thermoplastic unmodified polystyrene resin or from five to 60 parts per 100 parts of high density polyethylene resin of a combination thermoplastic unmodified polystyrene resin and a finely divided siliceous filler. The high density polyethylene resins referred to above are generally characterized by a density of greater than about 0.94 and are usually in the range of 0.94 to about 0.97. These resins are essentially linear in structure and are commonly known as "linear polyethylene".

EXAMPLE 28

A piece of the polymeric film referred to in the previous paragraph measuring 6 inches × 8 inches was immersed in the aqueous ammonium polymeric salt solution described in Example 1 and then dried for 10 minutes at 85° C. A piece of aluminum five mils thick was then placed with the coated polymeric film in a Carver press at about 80 psi, and 110° C. for one minute. After cooling the laminate was removed and exhibited a peel strength in excess of the tensile strength of the four mil thick polymeric film between the paper-like polymeric film and the aluminum.

EXAMPLE 29

The procedure used in Example 28 was repeated with the exception that cellophane (regenerated cellulose) was substituted for the aluminum. A strong laminate was obtained.

EXAMPLE 30

Example 28 was repeated with the exception that a piece of masonite was substituted for the aluminum. A strong laminate was obtained.

EXAMPLES 31-35

The effect on polymer physical properties of having alkali metal moieties present in ethylene-acrylic acid copolymers remaining after the evolution of ammonia from ammonium-alkali metal salts of these carboxyl-containing polymers was demonstrated by the following examples.

Ethylene-acrylic acid copolymer containing 21 percent acrylic acid copolymerized therein and having a melt index of 330 dg./min. was dissolved in aqueous solutions containing varying amounts of sodium hydroxide and ammonium hydroxide by stirring at about 95° C.–98° C. The resultant ammonium-sodium salts of the ethylene-acrylic acid copolymer were recovered from solution by precipitation with acetone. The solid polymer salts were molded into test plaques which were used for physical property and water absorption determinations. Table 2 contains the data obtained compared with a Control (3) consisting of the untreated that is unneutralized original parent ethylene-acrylic acid copolymer.

TABLE 2

|  | g. NaOH (phr.) | g. $NH_3$ (28%) phr. | Sodium acrylate in product (wt. percent) | | Modulus (p.s.i.) | Tensile strength (p.s.i.) | Percent elongation | Water absorption wt. percent, 7 days |
|---|---|---|---|---|---|---|---|---|
|  |  |  | Calcd. | By I.R. |  |  |  |  |
| Control (3) |  |  | 0 | 0 | 4,650 | 2,950 | 590 | 0.06 |
| Example No.: |  |  |  |  |  |  |  |  |
| 31 | 1.3 | 20 | 3.0 | 4.0 | 24,765 | 2,800 | 415 | 0.15 |
| 32 | 2.7 | 18 | 6.0 | 7.9 | 49,974 | 3,543 | 360 | 0.22 |
| 33 | 3.8 | 16.2 | 8.5 | 9.6 | 59,876 | 3,936 | 322 | 0.77 |
| 34 | 5.4 | 13.6 | 12.0 | 12.1 | 60,331 | 4,457 | 314 | 2.0 |
| 35 | 8.1 | 9.8 | 18.0 | 15.8 | 62,012 | 4,521 | 276 | 20.2 |

The data of Table 2 illustrate that increasing the amount of sodium hydroxide in solution increases the sodium acrylate content in the dissolved polymer and consequently increases the modulus, tensile strength and water absorption of the polymer. The solution formulation, therefore, controls the stiffness, toughness, surface abrasion resistance and the water sensitivity of the deposited film. Thus, both temporary (strippable or aqueous cleaning solution soluble) or permanent (non-water sensitive) coatings and adhesives can be formulated by this method. Among the specific aqueous cleaning solutions that can be used to strip said temporary coatings are aqueous solutions of ammonia, soaps, detergents or surface active agents and the like. The detergents can be of the anionic, cationic or nonionic class.

EXAMPLE 36

In order to evaluate the effect of polyvinyl alcohol on the adhesion of ethylene-acrylic acid copolymer to various substrates a series of formulations are prepared by mixing 50 parts of a 20 percent solids aqueous solution of the ethylene-acrylic acid copolymer ammonium salt prepared as described in Example 3 with various parts of either a 15 percent solids aqueous solution of 71 percent hydrolyzed polyvinyl alcohol or a 20 percent solids solution of 98 percent hydrolyzed polyvinyl alcohol. Each of the resultant formulations is brush-coated onto aluminum or chrome plates, and dried for about 30 minutes at about 50°–60° C. to afford coatings about two mils thick.

As Controls (4, 5, and 6 respectively) 100 parts each of the ammonium polymer salt aqueous solution (15 percent solids), the 71 percent hydrolyzed polyvinyl alcohol (15 percent solids) aqueous solution and 98 percent hydrolyzed polyvinyl alcohol aqueous solution (20 percent solids) are used alone to coat two types of plates in a similar manner.

The peel strength of each coating is then determined as a measure of adhesion. Controls 4 and 5 with aluminum plate are unsatisfactory because the peel strengths are too high, viz., >15 lbs./in. Control 6 is unsatisfactory because the peel strength is too low <1 lb./in. for aluminum plate.

Using a mixture of about 50 parts of aqueous ammonium polymer salt (20 percent solids) and about 100 parts of aqueous 98 percent hydrolyzed polyvinyl alcohol (20 percent solids) a coating having a peel strength of about 2–3 lbs./in. can be obtained on aluminum plate.

Control 4 is too high for adhesion to chrome plate while Controls 5 and 6 are too low, viz. <½ lb./in. and 0 lbs./in. respectively. The following mixtures gave peel strengths to chrome plate of about two to 2.5 lbs./in.:

50 Parts of aqueous ammonium polymer salt solution (20 percent solids) blended with 50 or 40 parts of aqueous 71% hydrolyzed polyvinyl alcohol solution (15 percent solids) and 40 or 30 parts of aqueous 98 percent polyvinyl alcohol solution (20 percent solids).

EXAMPLES 37–44

The performance of dispersions of ammonium salts of ethylene-acrylic acid copolymers as pigment binders for paper coatings was demonstrated with two ethylene-acrylic acid copolymers containing 21 percent and 19 percent of acrylic acid, respectively, copolymerized therein, the first having a melt index of about 300 dg./min. and the second a melt index of about 60 dg./min. Both copolymers were converted to their ammonium salts with 1.25 equivalents of ammonia. Coating colors were prepared according to the formulations shown in Table 3 and coated on bleached sulfite paper stock with a No. 12 wire wound rod. A drying cycle of four minutes at 80° C. was used. Adhesion was evaluated qualitatively by sticking a strip of pressure sensitive tape to the coated paper substrate and then ripping it off by hand. Wet and dry rub properties of the coated paper substrates were evaluated by the standard hand or finger test, observing the amount of rub-off which smeared on black paper held adjacent the test paper. These test results demonstrated excellent adhesion and both dry and wet rub resistance of paper coated with the formulations delineated in Table 3.

TABLE 3

| Components, Parts | Examples 37 | 38 | 39 | 40 |
|---|---|---|---|---|
| Clay (1) | 100 | 90 | 100 | 90 |
| TiO$_2$ (2) |  | 10 |  | 10 |
| Water | 27 | 27 | 17 | 17 |
| TSP (3) | 0.3 | 0.3 | 0.3 | 0.3 |
| Polymer Dispersion (20%) (4) | 60 | 60 | 75 | 75 |
| Total Solids, % | 60 | 60 | 60 | 60 |
| % Binder (based on Pigment) | 12 | 12 | 15 | 15 |

(1) Astroplate — Georgia Kaolin Co.
(2) TiO$_2$ — Ti Pure FF — duPont
(3) TSP — Tetra sodium pyrophosphate — dispersing agent
(4) Aqueous dispersion of salt of ethylene-acrylic acid copolymer 337 M.I. (21% acrylic acid) 20% solids, prepared with 1.25 equivalents ammonia.

| Ref. 8064–84 Components, Parts | Examples 41 | 42 | 43 | 44 |
|---|---|---|---|---|
| Clay (1) | 100 | 100 | 90 | 90 |
| TiO$_2$ (2) |  |  | 10 | 10 |
| Water | 38 | 32 | 38 | 32 |
| TSP (3) | 0.3 | 0.3 | 0.3 | 0.3 |
| Polymer Dispersion (25%) (4) | 48 | 60 | 48 | 60 |
| Total Solids, % | 60 | 60 | 60 | 60 |
| % Binders (based on pigment) | 12 | 15 | 12 | 15 |

(1) KCS grade, Georgia Kaolin Co.
(2) Ti Pure — FF duPont
(3) TSP — Tetra sodium pyrophosphate — dispersing agent
(4) Aqueous dispersion of salt of ethylene-acrylic acid copolymer 60 M.I. (19% acrylic acid) 25% solids prepared with 1.25 equivalents ammonia.

EXAMPLES 45–66

The quantitative demonstration of enhanced water resistance of paper coated with blends of ethylene-acrylic acid copolymer and highly hydrolyzed polyvinyl alcohol was made by using the Cobb test (TAPPIT-441 OS–63). The paper rawstock (St. Regis semibleached kraft paper of 50 lb. basis weight was saturated with aqueous dispersions or solutions of polyvinyl alcohol alone or ethylene-acrylic acid copolymer neutralized with ammonium hydroxide alone as Controls and with blends of varying weight ratios of the above-named polymers. The total solids (TS) in the sizing baths were 0.5 percent, 1.0 percent and 2.0 percent. The per cent pick-up of sizing composition from the sizing bath was also recorded after drying the sized paper specimens. The Cobb test values were determined by measuring the water pick-up reported as grams of water per square meter of treated paper (g. H$_2$O/ m$^2$) after exposure of the dried sized paper to distilled water for two minutes at 73° F. The data delineated in Table 4 shows the enhanced water resistance of kraft paper tub sized with an aqueous dispersion of Vinol 125 (a trade mark of Air Reduction Co., Inc. for medium viscosity polyvinyl alcohol having a degree of hydrolysis of 99.7 + percent) and an ethylene-acrylic acid copolymer containing about 19 percent–21 percent acrylic acid copolymerized therein and having a melt index of about 330 dg./min.

EXAMPLE 67

The necessity of using highly or super hydrolyzed polyvinyl alcohol in conjunction with ethylene-acrylic acid copolymers for the obtainment of compositions exhibiting high water resistance was demonstrated with Control 14 and Example 67.

A blend of 60 parts of the ethylene-acrylic acid copolymer fully neutralized ammonium salt described in Example 45 dispersed in water with 40 parts of Vinol 523 (a trade mark Air Reduction Co., Inc. for polyvinyl alcohol having a degree of hydrolysis of 88 percent) to a solids content of 0.5 percent. St Regis semibleached rawstock was tub sized with the above described dispersion with a pick-up of 0.7 percent of the ethylene-acrylic acid copolymer-polyvinyl alcohol size. The Cobb water resistance value measured at ambient room temperature with exposure to distilled water for two minutes was 87 g. $H_2O/m^2$ (Control 14). Example 67 was run by the procedure just described but with the exception that Vinol 350 (trade mark of Air Reduction Co., Inc. for polyvinyl alcohol having a degree of hydrolysis above 98 percent) was used in place of Vinol 523. The Cobb water resistance value of Example 67 was 27 g. $H_2O/m^2$.

TABLE 4

Tub Sizing Of Kraft Paper

| Example No. | Ratio of Copolymer Salt to Polyvinyl Alcohol | % Solids in Bath | % Pick-up of Size | Cobb Value g.$H_2O$/in.$^2$ |
|---|---|---|---|---|
| Control 7 | 100:0 | 0.5 | 0.7 | 103 |
| 45 | 95:5 | 0.5 | 0.7 | 59 |
| 46 | 90:10 | 0.5 | 0.7 | 51 |
| 47 | 75:25 | 0.5 | 0.7 | 44 |
| 48 | 60:40 | 0.5 | 0.7 | 29 |
| 49 | 50:50 | 0.5 | 0.7 | 47 |
| 50 | 45:55 | 0.5 | 0.7 | 74 |
| 51 | 40:60 | 0.5 | 0.7 | 73 |
| 52 | 35:65 | 0.5 | 0.7 | 89 |
| 53 | 25:75 | 0.5 | 0.7 | 110 |
| 54 | 10:90 | 0.5 | 0.7 | 122 |
| 55 | 5:95 | 0.5 | 0.7 | 134 |
| Control 8 | 0:100 | 0.5 | 0.7 | 137 |
| Control 9 | 100:0 | 1.0 | 1.4 | 87 |
| 56 | 95:5 | 1.0 | 1.4 | 82 |
| 57 | 90:10 | 1.0 | 1.4 | 61 |
| 58 | 75:25 | 1.0 | 1.4 | 34 |
| 59 | 60:40 | 1.0 | 1.4 | 24 |
| 60 | 50:50 | 1.0 | 1.4 | 24 |
| 61 | 45:55 | 1.0 | 1.4 | 29 |
| 62 | 40:60 | 1.0 | 1.4 | 29 |
| 63 | 25:75 | 1.0 | 1.4 | 35 |
| 64 | 10:90 | 1.0 | 1.4 | 111 |
| 65 | 5:95 | 1.0 | 1.4 | 124 |
| Control 10 | 0:100 | 1.0 | 1.4 | 135 |
| Control 11 | 100:0 | 2.0 | 2.8 | 62 |
| 66 | 50:50 | 2.0 | 2.8 | 25 |
| Control 12 | 0:100 | 2.0 | 2.8 | 139 |
| Control 13 | 0:0 | 0 | 0 | 147 |

Although the invention has been described in its preferred forms, it is understood that the present disclosure has been made only by way of example, and that numerous changes in the details may be resorted to without departing from the spirit and the scope of the invention.

What is claimed is:

1. Paper coating and size composition comprising
   1. about 95 to 20 parts by weight of a normally solid ethylene-acrylic acid copolymer ammonium salt having about 10 to 25 weight per cent of an acrylic acid copolymerized therein; and
   2. about five to 80 parts by weight of a polyvinyl alcohol having a degree of hydrolysis of more than 98 percent.

2. Composition claimed in claim 1 wherein the ethylene-acrylic acid copolymer contains about 13–22 percent acrylic acid copolymerized therein.

3. Composition claimed in claim 2 wherein the ratio of ethylene-acrylic acid copolymer to polyvinyl alcohol is in the range of about 60:40 to 50:50.

4. Composition claimed in claim 3 wherein the degree of hydrolysis of the polyvinyl alcohol is greater than 99 percent.

5. Composition claimed in claim 2 wherein the degree of hydrolysis of the polyvinyl alcohol is greater than 99.8 percent.

6. An article comprising paper coated with a composition comprising:
   1. about 95 to about 20 parts by weight of a normally solid ethylene-acrylic acid copolymer having about 10 to 25 weight per cent of an acrylic acid copolymerized therein; and
   2. about five to about 80 parts by weight of a polyvinyl alcohol having a degree of hydrolysis of more than 98 per cent.

7. Article claims in claim 6 wherein the acrylic acid copolymer contains about 13–22 per cent acrylic acid copolymerized therein.

8. The article claimed in claim 6 wherein the ratio of ethylene-acrylic acid copolymer to polyvinyl alcohol is in the range of about 60:40 to 50:50.

9. Article claimed in claim 6 wherein the degree of hydrolysis of the polyvinyl alcohol is greater than 99 percent.

10. Article claimed in claim 6 wherein the degree of hydrolysis of the polyvinyl alcohol is greater than 99.8 per cent.

* * * * *